United States Patent [19]

Wang et al.

[11] Patent Number: 5,108,972
[45] Date of Patent: Apr. 28, 1992

[54] PROCESS OF MAKING HALIDE/ALKOXY-CONTAINING MAGNESIUM COMPLEX

[75] Inventors: Bor-Ping E. Wang, Ossining; Elliot I. Band, North Tarrytown; Andrzej M. Piotrowski; Richard J. Amata, both of Peekskill, all of N.Y.

[73] Assignee: Akzo NV, Arnhem, Netherlands

[21] Appl. No.: 596,275

[22] Filed: Oct. 12, 1990

Related U.S. Application Data

[63] Continuation-in-part of Ser. No. 421,873, Oct. 16, 1989, abandoned, and a continuation-in-part of Ser. No. 422,164, Oct. 16, 1989, abandoned, and a continuation-in-part of Ser. No. 436,283, Nov. 13, 1989, abandoned, and a continuation-in-part of Ser. No. 497,293, Mar. 22, 1990, abandoned, and a continuation-in-part of Ser. No. 497,294, Mar. 22, 1990, Pat. No. 5,081,320, and a continuation-in-part of Ser. No. 497,295, Mar. 22, 1990, Pat. No. 5,023,385.

[51] Int. Cl.$^5$ ............................................. B01J 31/00
[52] U.S. Cl. ................................. 502/171; 502/125; 502/111
[58] Field of Search ....................... 502/111, 125, 171

[56] References Cited

U.S. PATENT DOCUMENTS

| | | | |
|---|---|---|---|
| 3,859,231 | 1/1975 | Kochhar et al. | 502/111 |
| 4,105,585 | 8/1978 | Matheson | 502/111 |
| 4,335,016 | 6/1982 | Dombro | 502/125 |
| 4,727,051 | 2/1988 | Breen et al. | 502/171 |
| 4,792,640 | 12/1988 | Mehta | 502/111 |
| 4,806,696 | 2/1989 | Job | 502/171 |
| 4,820,879 | 4/1989 | Mehta | 502/171 |

*Primary Examiner*—Patrick P. Garvin
*Assistant Examiner*—E. D. Irzinski
*Attorney, Agent, or Firm*—Richard P. Fennelly; Louis A. Morris

[57] ABSTRACT

Hydrocarbon-soluble complexes of magnesium haloalkoxides and alcohols ($X_n Mg(OR)_{2-n} \cdot mR'OH\ pR''OH$) are prepared in a non-Grignard reaction involving combination of sources of magnesium, halide, and alkoxide in the presence of an excess of the alcohol for the desired alkoxy group and an amount of lower alkyl alcohol to effect the desired solubilization of the complex.

27 Claims, No Drawings

PROCESS OF MAKING HALIDE/ALKOXY-CONTAINING MAGNESIUM COMPLEX

This is a continuation-in-part of each of the following patent applications: U.S. Ser. Nos. 421,873 and 422,164, each filed Oct. 16, 1989 and now abandoned; U.S. Ser. No. 436,283, filed Nov. 13, 1989 and now abandoned; and U.S. Ser. No. 497,293, filed Mar. 22, 1990 and now abandoned; and U.S. Ser. No. 497,294 filed Mar. 22, 1990, now U.S. Pat. No. 5,081,320; and U.S. Ser. No. 497,295, filed Mar. 22, 1990 and now U.S. Pat. No. 5,028,385.

BACKGROUND OF THE INVENTION

Magnesium compositions containing halide and alkoxy moieties of the general formula $X_nMg(OR)_{2-n}$, where n is in the range of $0 < n < 2$, are known and have been found to be useful as olefin polymerization catalyst supports or components (see U.S. Pat. No. 4,209,602).

Several recent examples of disclosures relating to this general area of technology include the following:

U.S. Pat. No. 4,727,051 to M. J. Breen et al. describes such compounds in which the R group of the alkoxy ligands is $C_1$-$C_{10}$ alkyl which are formed by (a) preparing an adduct of a magnesium halide and an alkanol; (b) reacting the product from step (a) with metallic magnesium; and drying the product of step (b) at an elevated temperature.

U.S. Pat. No. 4,792,640 to V. C. Mehta describes hydrocarbon-soluble compounds of the formula ROMgX, where R is a primary 2-alkyl substituted radical containing 5 to 18 carbon atoms and X is halide. These compounds are formed by reacting activated magnesium metal with an alkyl halide in an inert solvent to form a Grignard reagent which is then reacted with an oxygen-containing compound, including an alcohol, to produce the desired compound ROMgX.

U.S. Pat. No. 4,820,879 describes preparation of hydrocarbyloxy magnesium halides by reacting activated magnesium metal with an oxygen-containing compound and an anhydrous hydrogen halide.

SUMMARY OF THE INVENTION

The present invention, in its broadest sense, involves a process for forming hydrocarbon-soluble halide, alkoxy-containing magnesium complexes in a non-Grignard reaction (i.e., not involving reaction of a dialkylmagnesium compound and an alkyl halide as essential reactants to form a compound having the formula RMgX where X is halide and R is alkyl). The present process relies upon the combination of appropriate sources of magnesium, halide, and alkoxide in the presence of a slight excess of the parent alcohol for the desired alkoxy group (OR) and an amount of a lower alkyl alcohol (e.g., an alcohol containing an alkyl group of from about one to about four carbon atoms) to effect solubilization of the resulting complex.

The amount of "free" alcohol (combined amount of parent and lower alkyl alcohol) which should be used to achieve solubility needs to be no less than about 6 wt% of the composition. "Free" alcohol is the excess alcohol present as compared to the molar amount of magnesium present in the complex. As the "free" alcohol concentration is decreased below this amount (about 6 wt%), the complex formed tends to become insoluble.

The present invention, in one embodiment, relates to a process for forming a hydrocarbon-soluble complex of a magnesium haloalkoxide and an alcohol by combining a magnesium halide, a magnesium alkoxide and the aforesaid alcohol mixture, in an inert hydrocarbon solvent, to form the hydrocarbon-soluble complex. The combination may be made by first combining the magnesium halide and alcohol followed by addition of the alkoxide. Alternatively, and preferably, the alkoxide and magnesium halide are first combined followed by addition of the mixture of alcohols.

The present invention, in another embodiment of the invention, relates a process of preparing hydrocarbon-soluble complexes of a magnesium halohydrocarbyloxide and an alcohol by combining a magnesium halide with hydrocarbon solvent or solvents and alcohols followed by heating, if necessary, to dissolve the halide and form a solution, followed by addition of a magnesium metal source. The term "magnesium halide" is inclusive of compounds of the formula $MgX_2$ where X is halogen, e.g., chlorine. The term "alcohol" is inclusive of compounds of the formula ROH where R is a $C_1$ to $C_{12}$ straight or branched alkyl group, e.g., 2-ethylhexyl or an aralkyl group, e.g., benzyl alcohol. The term "hydrocarbon solvent" is inclusive of such solvents as toluene, alkyl alcohols such as ethanol, or mixtures thereof, which can be used to enhance the solubility of the magnesium halide.

The present invention, in accordance with yet another embodiment of the invention, relates a process of preparing hydrocarbon-soluble complexes of a magnesium haloalkoxide and an alcohol by forming a mixture of magnesium metal in hydrocarbon solvent, adding magnesium halide thereto, followed by addition of the alcohols.

DETAILED DESCRIPTION OF THE INVENTION

The present invention, in its broadest sense, involves a process for forming hydrocarbon-soluble halide, alkoxy-containing magnesium complexes in a non-Grignard reaction (i.e., not involving reaction of a dialkylmagnesium compound and an alkyl halide as essential reactants). The present process relies upon the combination of appropriate sources of magnesium, halide, and alkoxide in the presence of a slight excess of the parent alcohol for the desired alkoxy group (R) and an amount of a lower alkyl alcohol (e.g., an alcohol containing an alkyl group of from about one to about four carbon atoms) to effect solubilization of the resulting complex.

One embodiment of the process of the instant invention comprises the initial step of dissolving a magnesium halide (such as magnesium dichloride) in an alcoholic solvent (such as a branched 2-alkyl substituted alcohol containing 5 to 12 carbon atoms as exemplified by 2-ethyl-1-hexanol) followed by heating (e.g., to about 100° C.). To the resulting reaction mixture is then added a magnesium $C_1$-$C_4$ alkoxide, such as magnesium ethoxide and an organic solvent, such as heptane. The reaction medium is then heated and any added solvent is thereby removed. Another process embodiment which is preferred involves the initial combining of magnesium halide and magnesium alkoxide, in an appropriate solvent, followed by addition of the alcohol. This procedure will result in less alcohol being needed than the first procedure since in the first process embodiment the magnesium halide will tend to form an initial adduct with the alcohol thereby using more of that additive than in the second process embodiment.

The first step of yet another embodiment of the general the process of the instant invention comprises the formation of a solution by the admixture of magnesium halide, hydrocarbon solvent or solvents, and alcohol. This admixture can be brought about by first combining the solvent(s) (e.g., toluene and ethanol) and alcohol to form a solution to which the magnesium halide is added followed by appropriate heating to effect dissolution of the magnesium halide. It has been found that ethanol, for example, if mixed with the alcohol first to form a solution can increase the solubility of the magnesium halide in forming the solution to which the magnesium metal source is added. This step yields a solution. The second step involves the addition of a magnesium metal source (either magnesium metal itself or a dialkylmagnesium compound) to form the desired reaction product which is further described below. This particular embodiment of the general process described herein is economically more attractive than processes which utilize relatively more expensive magnesium alkoxide reagents in such synthesis procedures. It also has the advantage of achieving a soluble system initially with its combination of magnesium halide, solvent(s), and alcohols thereby making it easier to achieve a final soluble product after the magnesium metal source is added.

The first step of yet another embodiment of the general process of the instant invention comprises the formation of a mixture of magnesium in an appropriate hydrocarbon solvent, e.g., heptane, and heating the solution. Preferably, the magnesium metal can be suitably activated. One preferred way is to also add a magnesium dialkyl (e.g., butyl ethyl magnesium) to the solvent containing the magnesium metal. To the resulting reaction mixture is then added a magnesium halide, preferably magnesium chloride. This addition is then followed by addition of alcohol, preferably a mixture of a $C_1$–$C_4$ alkyl alcohol, such as ethanol, and a branched (e.g., 2-alkyl substituted) $C_5$–$C_{12}$ alcohol, such as 2-ethylhexanol. Heat is applied to achieve the desired production of the reaction product described below. In this embodiment, the relatively expensive magnesium alkoxide reagent has been replaced with magnesium metal and appropriate parent alcohol.

The resulting reaction product from any of the previously described embodiments of the general procedure first described above, which is soluble in hydrocarbon solvents, such as heptane, is a complex of a magnesium haloalkoxide and an alcohols. It may be represented by the formula

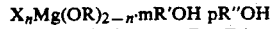
$X_n Mg(OR)_{2-n} \cdot mR'OH \cdot pR''OH$ where X is halogen, R, R' and R" are hydrocarbyl radicals (such as $C_1$–$C_{12}$ alkyl) and can be the same or different, n is in the range of $0 < n < 2$, and $m+p$ is in the range of $0 < m+p < 4$. Preferably, R' can be $C_1$ to $C_4$ alkyl and R" can be $C_5$–$C_{12}$ branched alkyl.

The instant invention is further understood by the Examples which follow.

EXAMPLE 1

Magnesium chloride (48.5 grams) was suspended in 210 grams of 2-ethyl-1-hexanol, and the suspension was heated to 100° C. At this point, 57 grams of magnesium ethoxide was added followed by 300 ml of heptane. The reaction mixture was stirred vigorously and was sparged with nitrogen to remove solvent. After 150 ml of solvent was evaporated, fresh heptane was added, and the reaction mixture was sparged with nitrogen until almost all solvent was removed. The reaction mixture temperature was 99° C. at the beginning of the evaporation and 130° C. at the end. The product, in the form of a very viscous oil, was dissolved in 500 grams of heptane and was left overnight to settle. The final product was filtered and diluted with heptane. The solution was analyzed with the following results: Mg wt% 2.70; Cl wt% 3.75; ethanol wt% 4.7; and free 2-ethyl-1-hexanol wt% 9.3.

EXAMPLE 2

The solution from Example 1 was diluted with heptane to contain 1.82% Mg. This solution (100 grams) was then used to prepare 11.7 grams of supported catalyst.

The catalyst was prepared from a solution of chloromagnesium alkoxide containing 1.82% Mg, 2.54% Cl, 6.31% 2-ethyl hexanol, and 3.19% ethanol. One hundred grams of solution containing 75 mmol Mg was added dropwise with stirring to 200 ml of $TiCl_4$ at $-25°$ C. The mixture was maintained at $-25°$ C. for 35 min and was then allowed to warm to room temperature. The mixture was heated to 111° C., at which time, 5.0 grams of diisobutylphthalate was added, and the heating was continued for two hours. The solid was filtered hot, was reslurried in 275 ml of $TiCl_4$, was heated for two hours, and was then filtered hot. The solids were washed twice with hot decane, were washed with hexane, and were dried with nitrogen to recover 11.7 grams of powdered catalyst.

The catalyst was tested in combination with triethyl aluminum and an external donor in hexane slurry to polymerize propylene. Hydrogen was added to control the MFI. The polymerization conditions were maintained at 100 psig and 70° C. for two hours. The yield was 9070 grams polymer/grams catalyst, with a total isotactic index of 94.4%, a melt flow index of 4.9 grams/10 min., and a tapped bulk density of 0.30 gram/ml.

EXAMPLE 3

This Example illustrates the preparation of a hydrocarbon-soluble chloromagnesiumalkoxide in accordance with the present invention. The preparation was conducted under a nitrogen atmosphere. The toluene, ethanol, and benzyl alcohol were dried over molecular sieve resin. Magnesium chloride (22.3 grams, 0.234 mole, under 0.2% water content) was weighed and charged into a 500 ml round bottom flask equipped with stir bar coated with TEFLON fluoropolymer. The vessel was purged with nitrogen. A solution of pure toluene (84 grams), benzyl alcohol (70 grams, 0.647 mole), and absolute ethanol (24.46 grams, 0.532 mole) was then added to the vessel. The vessel was heated to about 100° C. for about 20 minutes with stirring until the $MgCl_2$ became dissolved. Magnesium metal turnings (5.65 grams, 0.232 mole) were added to a separate three-neck flask equipped with a mechanical stirrer, dropping funnel, gas inlet, outlet, and solids addition port. Toluene (reagent grade, 43.7 grams) was then added followed by 1.0 gram of butyl ethyl magnesium (10.5% in heptane, 0.022 grams Mg, $9.1 \times 10^{-4}$ mole). The vessel was heated to about 105° C. for 15 minutes with stirring, and was then cooled. The toluene solution which contains $MgCl_2$/benzyl alcohol/ethanol was transferred into a dropping funnel through a tube of TEFLON fluoropolymer and then was added dropwise into the vessel with stirring. The vessel's temperature was maintained at about 90° C. for the addition of the remaining solution. After the addition, the vessel was heated to reflux (about 105° C.) and was maintained at that temperature with stirring for one hour. The vessel was cooled, and the liquid was slowly filtered through a 0.5 micron filter. The filtrate was a colorless mobile solution.

The filtrate was mixed with 140.3 grams of toluene to prepare a final solution of 20% $ClMgOC_7H_7$ in toluene/ethanol/benzyl alcohol. The final theoretical composition of the solution was:

| $ClMgOC_7H_7$ | 78 grams |
|---|---|
| "Free" benzyl alcohol | 19.5 grams |
| "Free" ethanol | 24.5 grams |
| Toluene | 268 grams |
| Total | 390 grams |

Estimated "Free Alcohol": 11.28% wt.

EXAMPLE 4

A 500 ml three-neck flask was equipped with a mechanical stirrer, condenser, gas inlet, outlet and solids addition port. The vessel was purged with nitrogen for 30 minutes replacing the atmosphere with nitrogen.

To this flask was added 103 grams of toluene through a syringe. Under stirring, 59.8 grams (0.553 mole) of benzyl alcohol and 22.2 grams (0.482 mole) of ethanol were charged into the flask. The solution was heated to 80° C. Magnesium chloride (22.3 grams, 0.234 mole) was added slowly through the solids addition port. After the addition was complete, the flask was heated to about 100° C. for 15 minutes until the $MgCl_2$ became dissolved, was then cooled to 75° C., and magnesium metal was added rapidly through the solids addition port under slow nitrogen flow. After the addition, the vessel was heated to reflux temperature and was maintained at that temperature with stirring for two hours. The filtration step was the same as in Example 1. The final theoretical composition of this solution was:

| $ClMgOC_7H_7$ | 78 grams |
|---|---|
| "Free" benzyl alcohol | 9.3 grams |
| "Free" ethanol | 22.2 grams |
| Toluene | 280.5 grams |
| Total | 390 grams |

Estimated "Free Alcohol": 8.08% wt.

EXAMPLE 5

A toluene/ethanol/$MgCl_2$/benzyl alcohol solution was prepared in accordance with the procedure of Example 2 except less ethanol and benzyl alcohol was used. 57.2 grams of benzyl alcohol and 17.8 grams of ethanol were added. The final theoretical composition of this solution was:

| $ClMgOC_7H_7$ | 78 grams |
|---|---|
| "Free" benzyl alcohol | 6.7 grams |
| "Free" ethanol | 17.8 grams |
| Toluene | 287.5 grams |
| Total | 390 grams |

Estimated "Free Alcohol": 6.28% wt.

COMPARATIVE EXAMPLE 6

Magnesium chloride, 1.11 grams (0.012 mole) was transferred into a 150 ml vial in a dry box. Substantially pure, dry toluene (40 ml) was then added followed by 5.82 ml (0.056 mole) of benzyl alcohol with stirring. The vial was heated to refluxing temperature for about 5 minutes. At this point, 12.3 grams of butylethylmagnesium (10.5 wt % in heptane, 0.011 mole Mg) was added dropwise to the vial with stirring. After the addition, the vial was maintained at a refluxing temperature for about 5 minutes. The final product was a white solid. This Example illustrates that a solid product was obtained when ethanol was not used in the preparation even if excess benzyl alcohol was present.

COMPARATIVE EXAMPLE 7

Following the procedure of Comparative Example 4, 1.12 grams of $MgCl_2$ (0.011 mole) was placed in a 150 ml vial along with 40 ml of toluene. Then, 4.5 ml of ethanol (3.53 grams, 0.077 mole) was added to the vial with stirring. The vial was heated to refluxing temperature for about 5 minutes. Then, 8.1 grams of butylethylmagnesium (15.6 wt % in heptane, 0.011 mole Mg) was added dropwise to the vial. After the addition, the vial was maintained at a refluxing temperature for about 5 minutes. The final product, chloromagnesium ethoxide, was a white solid.

COMPARATIVE EXAMPLE 8

In a 150 ml vial, 40 ml of dry toluene was charged by syringe followed by 2 ml of ethanol (1.57 grams, 0.034 mole). Then, 8.0 grams of butylethylmagnesium (15.6 wt % in heptane, 0.011 mole Mg) was added dropwise to the vial. During the addition, gas evolution was observed. After the addition, the vial was maintained at refluxing temperature for about 5 minutes. The final product, magnesium ethoxide, was a white solid.

EXAMPLE 9

Magnesium chloride, 1.11 grams (0.012 mole) of $MgCl_2$ was transferred into a 150 ml vial in a dry box. Substantially pure dry toluene (20 ml) was then charged by syringe. Under stirring, 3.47 grams (0.032 mole) of benzyl alcohol and 1.1 grams (0.024 mole) of ethanol were added to the vial. The vial was heated to a refluxing temperature for about 5 minutes. Then, 12.2 grams of butylethylmagnesium (10.5 wt % in heptane, 0.011 mole Mg) was added dropwise to the vial with stirring. After the addition, the vial was maintained at a refluxing temperature for about 5 minutes. The final product was a colorless solution. This Example illustrates that a solvent mixture of toluene and heptane allows for production of the desired soluble product.

COMPARATIVE EXAMPLE 10

Magnesium metal (0.28 gram 0.012 mole) and 1.13 gram (0.011 mole) of magnesium metal were placed in a 150 ml vial. Dry toluene (60 ml) was charged into the vial by syringe without ethanol being present as well. Then 6.65 gram of benzyl alcohol (0.06 mole) was added into the vial with stirring. After addition the vial was maintained at refluxing temperature for about 30 minutes. The final product was a white solid.

EXAMPLE 11

This Example illustrates the preparation of another hydrocarbon-soluble chloromagnesium hydrocarbyloxide. The preparation was conducted under a nitrogen atmosphere. The toluene, ethanol, and (for this Example) 2-octanol were dried over molecular sieves and degassed by purging with nitrogen. Magnesium chloride (22.3 grams, 0.234 mole, under 0.2% water content), toluene (104 grams), 2-octanol (76.7 grams, 0.673 mole), and absolute ethanol (30.4 grams, 0.661 mole) were mixed in a three neck round bottom flask equipment with a mechanical stirrer, condenser, and solids addition port. The vessel was heated to 111° C. for about 15-20 minutes with stirring until the $MgCl_2$ dissolved. Then, magnesium metal turnings (5.65 grams, 0.232 mole) were added to the solution mixture slowly, with control of the gas and heat evolution. As the reaction subsided, the solution was heated to reflux for 2-3 hours. The solution was then diluted with toluene (about 74 grams) and filtered through a 0.5 micron fluoropolymer (TEFLON brand) membrane in-line filter. Additional toluene (about 200 grams) was added to prepare a 17 wt % off-yellow 2-octoxy chloromagnesium solution.

| Magnesium, metal | 5.65 grams | 0.233 mole |
|---|---|---|
| Magnesium chloride | 22.3 grams | 0.234 mole |
| Toluene | 378 grams | |
| Abs. ethanol | 30.4 grams | 0.661 mole |
| 2-octanol | 7.4 grams | 0.673 mole |
| "$ClMg(OC_8H_{17})$" | 88.3 grams | 0.467 mole |
| Free "ethanol" | 30.4 grams | 0.661 mole |
| Free "2-octanol" | 23.5 grams | 0.206 mole |
| Toluene (total) | 378 grams | |
| Total | 520 grams (17.0 wt % sol'n) | |

EXAMPLE 12

This Example illustrates the preparation of another hydrocarbon-soluble chloromagnesium alkoxide. The preparation was conducted under a nitrogen atmosphere. The toluene, ethanol, and (for this Example) 2-octanol were dried over molecular sieves and degassed by purging with nitrogen. Magnesium chloride (22.3 grams, 0.234 mole, under 0.2% water content), toluene (104 grams), 2-octanol (76.7 grams, 0.673 mole), and absolute ethanol (30.4 grams, 0.661 mole) were mixed in a three neck round bottom flask equipped with a mechanical stirrer, condenser, and solids addition port. The vessel was heated to 111° C. for about 15-20 minutes with stirring until the $MgCl_2$ dissolved. Then, magnesium metal turnings (5.65 grams, 0.232 mole) were added to the solution mixture slowly, with control of the gas and heat evolution. As the reaction subsided, the solution was heated to reflux for 2-3 hours. The solution was then diluted with toluene (about 74 grams) and filtered through a 0.5 micron fluoropolymer (TEFLON brand) membrane in-line filter. Additional toluene (about 200 grams) was added to prepare a 17 wt % off-yellow 2-octoxy chloromagnesium solution.

| Magnesium, metal | 5.65 grams | 0.233 mole |
|---|---|---|
| Magnesium chloride | 22.3 grams | 0.234 mole |
| Toluene | 378 grams | |
| Abs. ethanol | 30.4 grams | 0.661 mole |
| 2-octanol | 7.4 grams | 0.673 mole |
| "$ClMg(OC_8H_{17})$" | 88.3 grams | 0.467 mole |
| Free "ethanol" | 30.4 grams | 0.661 mole |
| Free "2-octanol" | 23.5 grams | 0.206 mole |
| Toluene (total) | 378 grams | |
| Total | 520 grams (17.0 wt % sol'n) | |

EXAMPLE 13

This Example illustrates the preparation of magnesium chloroalkoxide. The process was conducted under a nitrogen atmosphere. The ethanol and 2-ethylhexanol used were dried over molecular sieve resin. Magnesium metal turnings (5.40 grams, 0.222 mole) of over 98% purity were added to a 500 ml flask equipped with a mechanical stirrer, dropping funnel, gas inlet, outlet, and solids addition port. The vessel was purged with nitrogen. Heptane (pure grade, 40 grams) was then added followed by 12.0 grams of butyl ethyl magnesium (10% in heptane, 0.264 grams Mg, 0.011 mole Mg, 10.7 grams heptane). The vessel was heated to about 100° C. for about 15 minutes with stirring, and was then cooled. Magnesium chloride (22.3 grams, 0.234 mole, under 0.2% water content) was then added rapidly through the solids addition port under a slow nitrogen flow, minimizing any possible exposure to air. A solution of pure heptane (60 grams), 2-ethylhexanol (83.4 grams, 0.642 mole), and absolute ethanol (22.0 grams, 0.478 mole) were added dropwise to the vessel with stirring over 15 minutes. During the initial addition, the vessel heated up to about 55° C., and viscosity increased. Subsequently, it began to cool and viscosity decreased with the addition of more alcohol. At this point, the vessel was heated to 80° C. and was maintained at this temperature for the addition of the remaining solution. It was important to insure that there was vigorous $H_2$ gas evolution throughout the addition to prevent the possibility of a sudden pressure surge in the vessel. After the addition, the vessel was heated to reflux (about 103° C.) and was maintained at that temperature with stirring for two hours. The vessel was cooled and the liquid was slowly filtered through a 40-60 micron frit. Depending on the frit, there may be some slight cloudiness to the filtrate which slowly settles and may be removed by careful decantation with a diptube.

The filtrate was mixed with 195 grams heptane without precipitation of any solids to prepare a final solution of 20 wt% $Cl-Mg-OC_8H_{17}$ in heptane/ethanol/2-ethylhexanol. The final theoretical composition of this composition was:

| $ClMgOC_8H_{17}$ | 88 grams |
|---|---|
| "Free" 2-ethylhexanol | 23 grams |
| "Free" ethanol | 22 grams |
| Heptane | 306 grams |
| Total | 439 grams |

COMPARATIVE EXAMPLE 14

Magnesium chloride, 1.11 grams (0.012 mole) $MgCl_2$ was transferred into a 150 ml vial in a dry box. Forty ml of pure dry toluene was then charged by syringe. Under stirring, 6.0 grams (0.056 mole) of benzyl alcohol was added by syringe. The vial was heated to refluxing temperature for about 5 minutes. At this point, 12.3 grams of BEM (10.5 wt% in heptane, 0.011 mole Mg) was added dropwise into the vial. After the addition was completed, the vial was maintained at refluxing temperature for at least 5 more minutes. The final product was a white solid. This Example showed that the solid product was obtained when large excess of reactant alcohol has been used.

The foregoing Examples are represented by certain embodiments of the invention and should not therefore be construed in a limiting sense. The scope of protection sought is set forth in the claims which follow.

We claim:

1. A process for forming hydrocarbon-soluble halide, alkoxy-containing magnesium complexes comprising a magnesium haloalkoxide moiety of the formula $X_nMg(OR)_{2-n}$, where X is halogen, R is hydrocarbyl and n is in the range of $0<n<2$ in a non-Grignard reaction which comprises the combination of sources of magnesium, halide, and alkoxide selected from the group consisting of magnesium halide, magnesium alkoxide, magnesium metal, and alcohol in the presence of an excess of the alcohol for the desired alkoxy group in the magnesium haloalkoxide and an amount of a different, lower alkyl alcohol to effect solubilization of the resulting complex.

2. A process as claimed in claim 1 which comprises combining a magnesium halide, a magnesium alkoxide, and the alcohols in an inert hydrocarbon solvent to form the complex.

3. A process as claimed in claim 2 which comprises initially combining the magnesium alkoxide and magnesium halide in the inert hydrocarbon solvent followed by addition of the alcohols thereto.

4. A process as claimed in claim 2 which comprises dissolving the magnesium halide in alcohol and thereafter adding the magnesium alkoxide and solvent thereto.

5. A process as claimed in claim 2 wherein the magnesium halide is magnesium dichloride.

6. A process as claimed in claim 2 wherein the magnesium alkoxide is a magnesium $C_1$–$C_4$ alkoxide.

7. A process as claimed in claim 5 wherein the magnesium alkoxide is a magnesium $C_1$–$C_4$ alkoxide.

8. A process as claimed in claim 2 wherein the magnesium halide is magnesium dichloride.

9. A process as claimed in claim 1 wherein the lower alkyl alcohol is a $C_1$ to $C_4$ alkyl alcohol and the alcohol for the desired alkoxy group is a $C_5$ to $C_{12}$ branched alkyl alcohol.

10. A process as claimed in claim 2 wherein the magnesium halide is magnesium chloride, the magnesium alkoxide is a magnesium $C_1$–$C_4$ alkoxide, and the alcohol for the desired alkoxy group is a $C_5$ to $C_{12}$ branched alkyl alcohol.

11. A process as claimed in claim 10 wherein the $C_5$ to $C_{12}$ alcohol is 2-ethyl-1-hexanol and the magnesium alkoxide is magnesium ethoxide.

12. A process as claimed in claim 1 which comprises combining magnesium halide with a solution comprising the alcohol for the desired alkoxy group, the lower alkyl alcohol, and solvent and forming a solution thereform and by thereafter adding a source of magnesium metal selected from the group consisting of magnesium halide, magnesium alkoxide, and magnesium metal to the solution.

13. A process as claimed in claim 12 wherein the magnesium metal source is selected from the group consisting of magnesium metal and a dialkylmagnesium compound.

14. A process as claimed in claim 12 wherein the magnesium halide is magnesium chloride.

15. A process as claimed in claim 12 wherein the magnesium halide is magnesium chloride and the alcohol for the desired alkoxy group comprises an alkyl group or an aralkyl group.

16. A process as claimed in claim 12 wherein the solvent comprises ethanol and the magnesium halide is magnesium chloride.

17. A process as claimed in claim 1 wherein the magnesium halide is magnesium chloride and the alcohol for the desired alkoxy group comprises an aralkyl group.

18. A process as claimed in claim 17 wherein the alcohol for the desired alkoxy group is benzyl alcohol.

19. A hydrocarbon solution containing dissolved therein a complex of a magnesium halohydrocarbyloxide formed by the process of claim 1.

20. A process as claimed in claim 1 which comprises forming a mixture of magnesium metal and another hydrocarbon solvent, adding magnesium halide thereto, and then adding the alcohols.

21. A process as claimed in claim 20 wherein the mixture of magnesium metal and hydrocarbon solvent additionally comprises a dialkyl magnesium activating agent for the magnesium metal.

22. A process as claimed in claim 20 wherein the magnesium halide is magnesium chloride.

23. A process as claimed in claim 20 wherein the magnesium halide is magnesium chloride and the alcohol for the desired alkoxy group which is added is a 2-alkyl substituted branched alcohol having 5 to 12 carbon atoms.

24. A process as claimed in claim 20 wherein the lower alkyl alcohol is ethanol and the magnesium halide is magnesium chloride.

25. A process as claimed in claim 20 wherein the magnesium halide is magnesium chloride and the lower alkyl alcohol is a $C_1$–$C_4$ alkyl alcohol and the alcohol for the desired alkoxy group is a $C_5$–$C_{12}$ branched alkyl alcohol.

26. A process as claimed in claim 25 wherein the lower alkyl alcohol is ethanol and the alcohol for the desired alkoxy group is 2-ethylhexanol.

27. A process as claimed in claim 25 wherein the mixture of magnesium metal and hydrocarbon solvent additionally comprises a dialkyl magnesium activating agent for the magnesium metal.

* * * * *